United States Patent
Lin et al.

(10) Patent No.: US 9,667,136 B1
(45) Date of Patent: May 30, 2017

(54) TOTEM-POLE POWER FACTOR CORRECTION CIRCUIT

(71) Applicant: SEA SONIC ELECTRONICS CO., LTD., Taipei (TW)

(72) Inventors: Pao-Tsun Lin, Taipei (TW); Ten-Chun Chen, Taipei (TW)

(73) Assignee: SEA SONIC ELECTRONICS CO., LTD., Taipei (TW)

( * ) Notice: Subject to any disclaimer, the term of this patent is extended or adjusted under 35 U.S.C. 154(b) by 0 days.

(21) Appl. No.: 15/239,021

(22) Filed: Aug. 17, 2016

(51) Int. Cl.
*H02M 7/06* (2006.01)
*H02M 1/42* (2007.01)
*H02M 7/04* (2006.01)

(52) U.S. Cl.
CPC ........... *H02M 1/4208* (2013.01); *H02M 7/04* (2013.01)

(58) Field of Classification Search
CPC ...... H02M 1/081; H02M 1/4208; H02M 7/00; H02M 7/04; H02M 7/06; H02M 7/219; H02M 7/217; H02M 3/33592; H02M 2001/4291; H02M 1/4258
USPC .................. 363/125–127, 132; 323/207, 304
See application file for complete search history.

(56) References Cited

U.S. PATENT DOCUMENTS

| 2011/0012579 A1* | 1/2011 | Huang | H02M 1/4208 |
| | | | 323/304 |
| 2012/0139505 A1* | 6/2012 | Ren | H02M 1/4225 |
| | | | 323/207 |

* cited by examiner

*Primary Examiner* — Adolf Berhane
*Assistant Examiner* — Afework Demisse
(74) *Attorney, Agent, or Firm* — Muncy, Geissler, Olds & Lowe, P.C.

(57) ABSTRACT

A totem-pole power factor correction circuit (totem-pole PFC) is connected behind an input inductor receiving electric power from an alternating current (AC) power source. The totem-pole PFC is provided, in a high-frequency working area thereof, with at least two current transformer elements or a center-tapped current transformer element. The waveform of current flowing through the totem-pole PFC during positive and negative half cycles of AC power is sensed via the current transformer elements or the center-tapped current transformer element. Thereby, current waveform for the input inductor during positive and negative half cycles may be realized via the obtained current waveform completely, such that the practical problems originating from the conventional necessity for the establishment of bulky Hall device or another current-sensing unit are solved specifically.

10 Claims, 11 Drawing Sheets

US 9,667,136 B1

TOTEM-POLE POWER FACTOR CORRECTION CIRCUIT

FIELD OF THE INVENTION

The present invention is related to a totem-pole power factor correction circuit, particularly to a totem-pole power factor correction circuit having a current transformer element established in a high-frequency working area to sense the current passing through an input inductor.

BACKGROUND OF THE INVENTION

It is known that a modem totem-pole power factor correction circuit is illustrated in FIG. 1. If sensing the current flowing through an input inductor 9 connected in series with the totem-pole power factor correction circuit 8 is desired, a current sensor 7 connected in series between the input inductor 9 and a first bridge arm 81 of the totem-pole power factor correction circuit 8 is required. This type of series connection is illustrated in FIG. 1.

In the implementation of the circuit, however, it is necessary to select a Hall device as the current sensor, due to the change of polarity of the input inductor 9 as well as both high- and low-frequency components being simultaneously contained therein because the alternating current power source is applied. Although the Hall device is capable of detecting the current flowing through the input inductor 9, the Hall device is bulky so as to occupy larger wiring space, being unfavorable to the implementation of miniaturization appealed by modern electronic equipments. Besides, the choice of Hall device may lead to the increase in cost of overall circuit.

SUMMARY OF THE INVENTION

It is the main object of the present invention to solve the practical problems originating from conventional necessity for bulky Hall device or another current-sensing unit.

For achieving the above object, the present invention provides a totem-pole power factor correction circuit (totem-pole PFC) connected behind an input inductor receiving electric power from an alternating current (AC) power source. The AC power source is provided with a first connecting terminal connected to the input inductor, and a second connecting terminal. The totem-pole PFC comprises a first bridge arm, a second bridge arm and a capacitor. The first bridge arm comprises a first switch and a second switch connected in series with the first switch. The first bridge arm is connected to the input inductor at a series connection point between the first switch and the second switch. The second bridge arm is connected in parallel with the first bridge arm and comprises a third switch and a fourth switch connected in series with the third switch. The second bridge arm is connected to the second connecting terminal of the AC power source at a series connection point between the third switch and the fourth switch. The capacitor is connected in parallel with the first bridge arm and the second bridge arm. In this case, the first bridge arm is presented as a high-frequency working area, and provided with a first current transformer element being connected in series with the first switch and generating a first detecting signal by sensing, as well as a second current transformer element being connected in series with the second switch and generating a second detecting signal by sensing. The first detecting signal and the second detecting signal are integrated to obtain current waveform for the input inductor.

In one embodiment, the first current transformer element is connected with a first rectifying unit for rectifying the first detecting signal, while the second current transformer element is connected with a second rectifying unit for rectifying the second detecting signal. Further, each of the first rectifying unit and the second rectifying unit is presented as a full-wave rectifying configuration individually.

In one embodiment, a branch to which the capacitor is attached is presented as the high-frequency working area. The branch comprises a third current transformer element generating a third detecting signal. The current waveform for the input inductor is then obtained by integrating the first detecting signal, the second detecting signal and the third detecting signal. Further, the first current transformer element is connected with a first rectifying unit rectifying the first detecting signal, the second current transformer element is connected with a second rectifying unit rectifying the second detecting signal, and the third current transformer element is connected with a third rectifying unit rectifying the third detecting signal. Further, each of the first rectifying unit, the second rectifying unit and the third rectifying unit is presented as a half-wave rectifying configuration individually.

In addition to the technical solution described above, the present invention also provides another totem-pole PFC. The totem-pole PFC is connected behind the input inductor receiving electric power from the AC power source. The AC power source is provided with the first connecting terminal connected to the input inductor, and the second connecting terminal. The totem-pole PFC comprises a first bridge arm, a second bridge arm and a capacitor. The first bridge arm comprises a first switch and a second switch connected in series with the first switch. The second bridge arm is connected in parallel with the first bridge arm, and comprises a third switch and a fourth switch connected in series with the third switch. The second bridge arm is connected to the second connecting terminal of the AC power source at a series connection point between the third switch and the fourth switch. The capacitor is connected in parallel with the first bridge arm and the second bridge arm. In this case, the first bridge arm is presented as the high-frequency working area and provided with a center-tapped current transformer element provided between the first switch and the second switch as well as connected to the input inductor, and a fourth rectifying unit connected to the center-tapped current transformer element. A fourth detecting signal is generated by the center-tapped current transformer element. The fourth detecting signal is rectified by the fourth rectifying unit to obtain a rectified signal 46 corresponding to current waveform for the input inductor.

In one embodiment, the center-tapped current transformer element comprises a primary winding and a secondary winding with magnetic induction formed therebetween. The primary winding further comprises a first subwinding, a second subwinding, and a center tap connected to the first subwinding, the second subwinding and the input inductor.

In one embodiment, the fourth rectifying unit may be presented as a half-wave rectifying configuration or a full-wave rectifying configuration.

In the embodiment of the present invention disclosed above, there are features, in comparison with the prior art, as follows: at least two current transformer elements or the center-tapped current transformer element may be established in the high-frequency working area of overall circuit for the totem-pole power factor correction circuit of the present invention. The variance of current flowing through the input inductor during positive and negative half cycles is detected completely via the current transformer elements or the center-tapped current transformer element. The present invention is implemented by the two current transformer elements or the center-tapped current transformer element, such that the problems of bulky element and increase in cost originating from conventional application of Hall device may be further solved specifically.

DETAILED DESCRIPTION OF THE PREFERRED EMBODIMENTS

Figure 1:
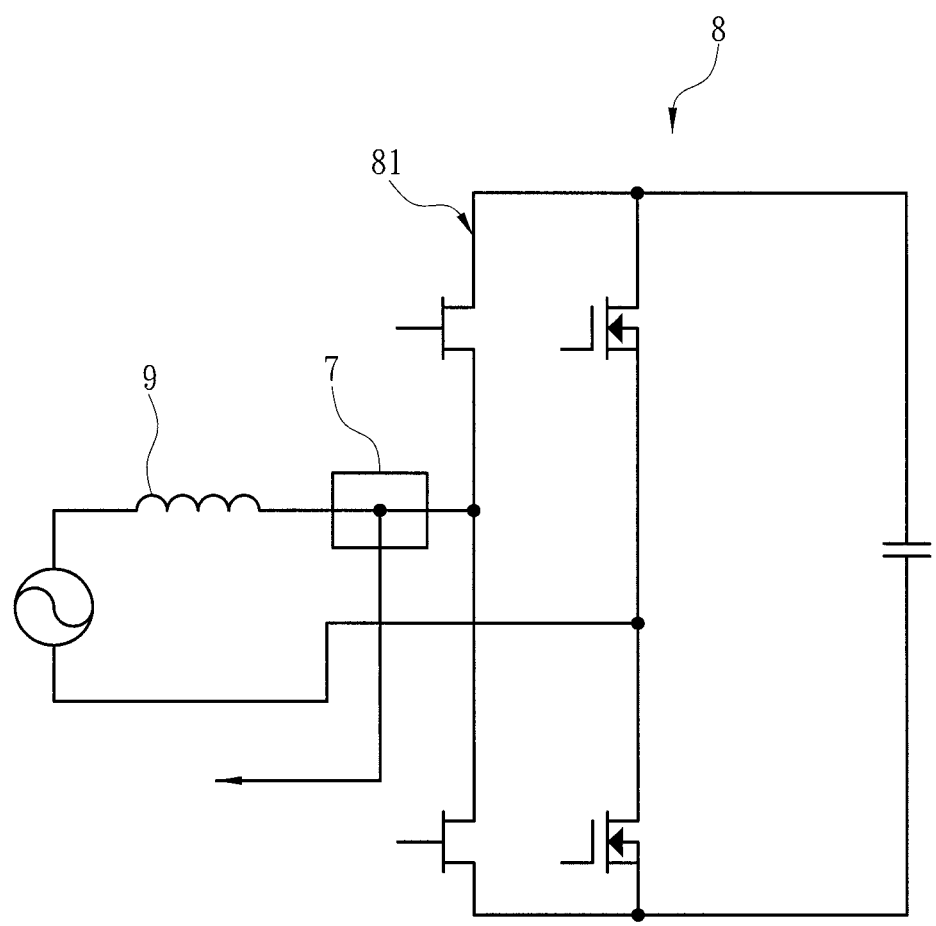
FIG. 1 is a diagram of a conventional circuit composition.
Figure 2:
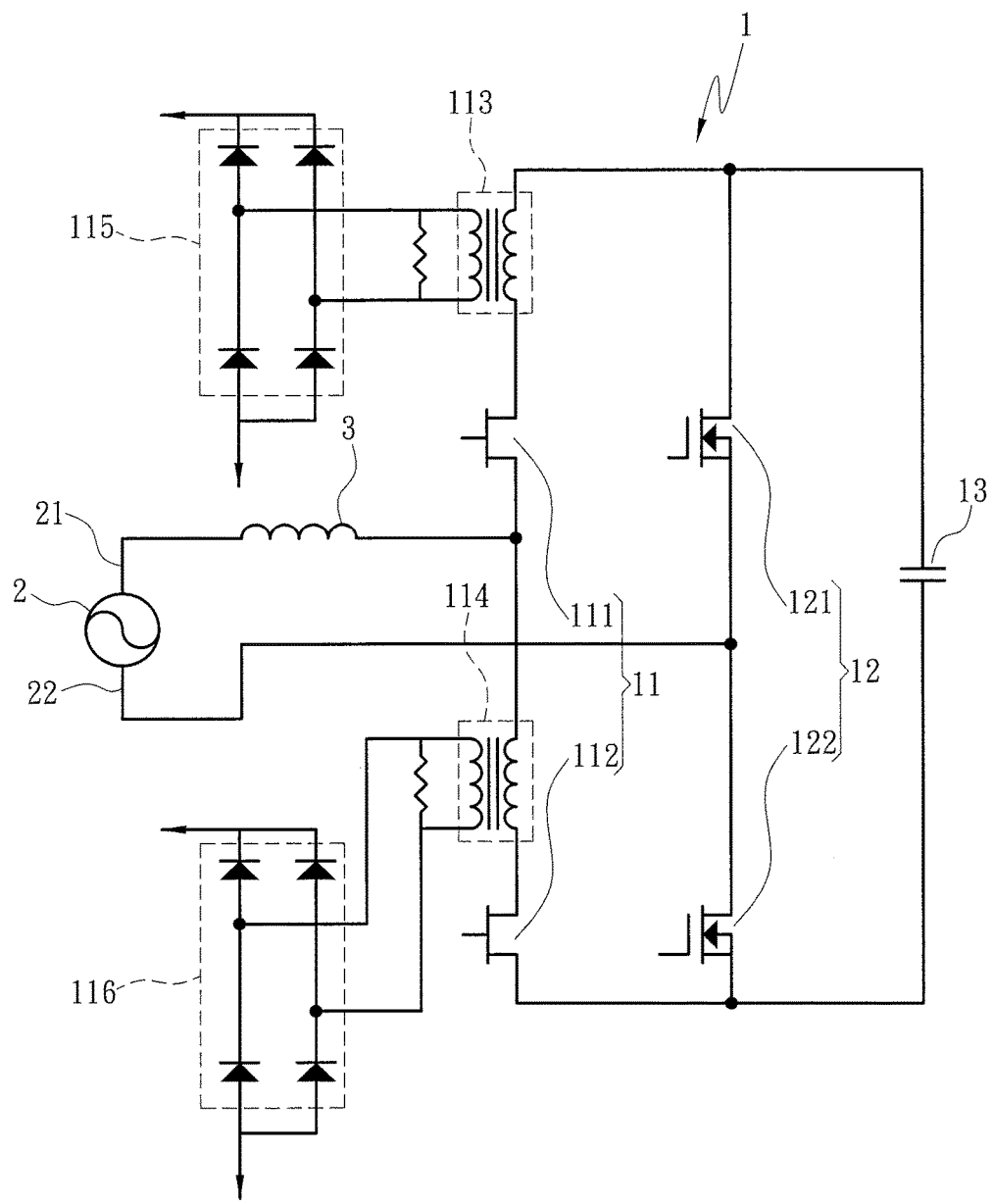
FIG. 2 is a diagram of a circuit composition of a first embodiment of the present invention.

Referring to FIG. 2, a totem-pole power factor correction circuit (totem-pole PFC) 1 is connected behind an input inductor 3 receiving electric power from an alternating current (AC) power source 2. The AC power source 2 is provided with a first connecting terminal 21 connected to the input inductor 3, and a second connecting terminal 22. Furthermore, the first connecting terminal 21 is the positive output terminal of the AC power source 2, while the second connecting terminal 22 is the negative output terminal of the AC power source 2. Further, the totem-pole PFC 1 comprises a first bridge atm 11, a second bridge arm 12 connected in parallel with the first bridge arm 11, and a capacitor 13 connected in parallel with the first bridge arm 11 and the second bridge arm 12. In this case, the first bridge arm 11 comprises a first switch 111 and a second switch 112 connected in series with the first switch 111. Each of the first switch 111 and the second switch 112 is an active element, such as GaN FET, ultra-fast IGBT and etc. The first switch 111 and the second switch 112 are controlled by on-off signals, respectively, provided by a control unit (not shown in this figure). The on-off signals received by the first switch 111 and the second switch 112 are different from each other. Additionally, the first bridge arm 11 is connected to the input inductor 3 at a series connection point between the first switch 111 and the second switch 112.

On the other hand, the second bridge arm 12 comprises a third switch 121 and a fourth switch 122 connected in series with the third switch 121. Each of the third switch 121 and the fourth switch 122 may be an active element or passive, respectively, said active element being just like a FET, said passive element being then like a diode. Moreover, if the third switch 121 and the fourth switch 122 are active elements, the third switch 121 and the fourth switch 122 are controlled by on-off signals provided by the control unit, the on-off signals received by the third switch 121 and the fourth switch 122 being different from each other. Additionally, the second bridge arm 12 is connected to the second connecting terminal 22 of the AC power source 2 at a series connection point between the third switch 121 and the fourth switch 122.

Figure 3:
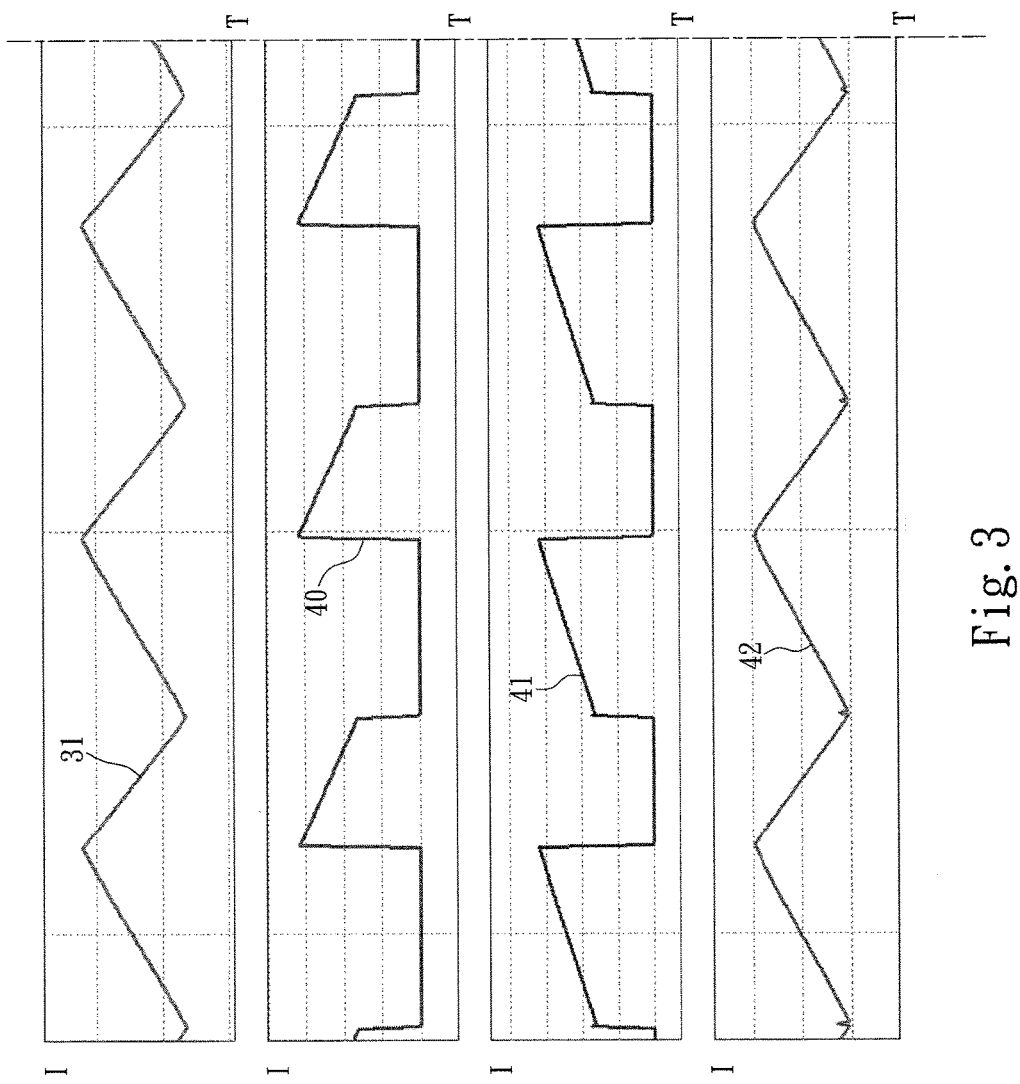
FIG. 3 is a diagram of current waveform during positive half cycle of the first embodiment of the present invention.
Figure 4:
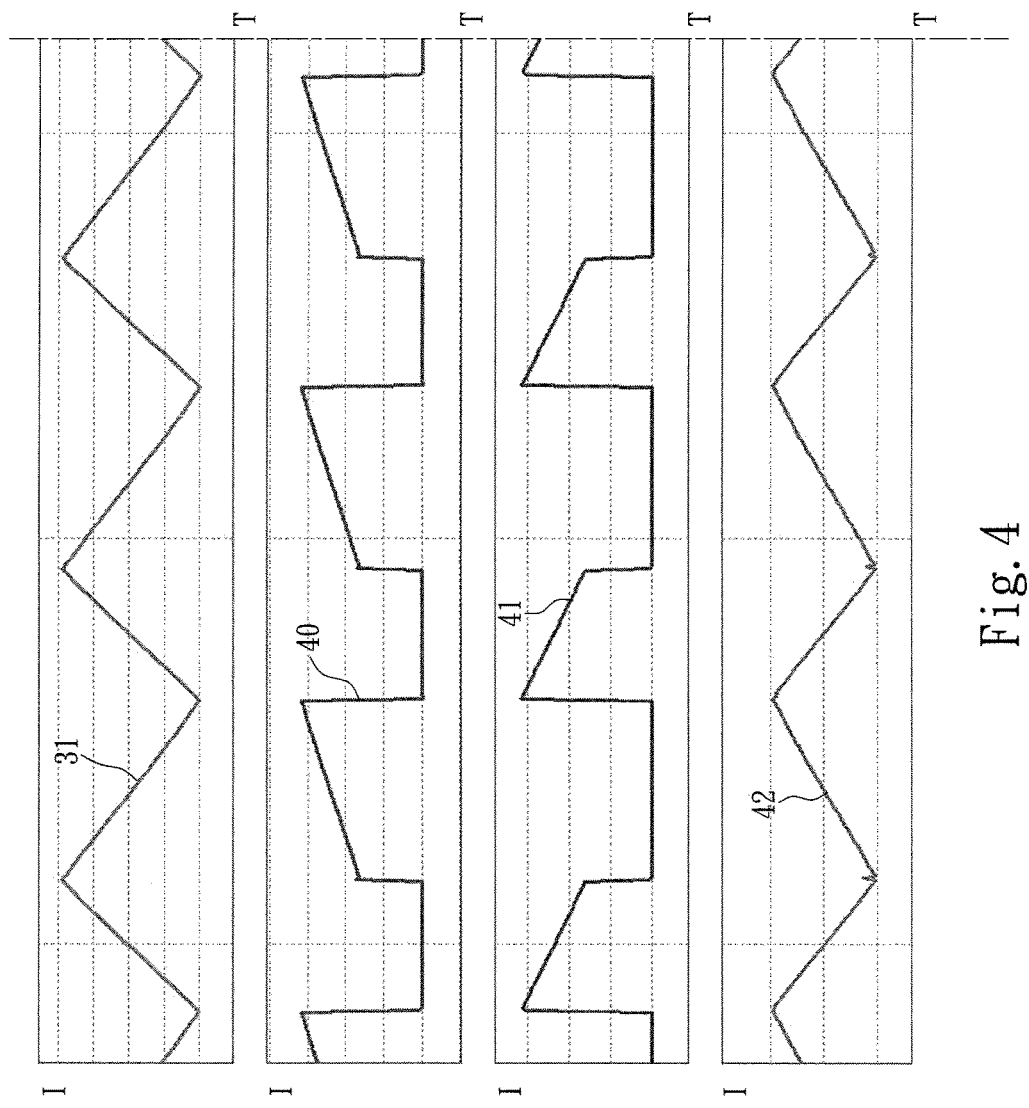
FIG. 4 is a diagram of current waveform during negative half cycle of the first embodiment of the present invention.

Referring to FIGS. 2 to 4 together, the working frequency of the first bridge arm 11 is further controlled to be higher than that of the second bridge arm 12 by the totem-pole PFC 1. Therefore, the first bridge arm 11 is presented as a high-frequency working area in the overall circuit of the totem-pole PFC 1. Then, the totem-pole PFC 1 is further provided with a first current transformer element 113 being connected in series with the first switch 111 and generating a first detecting signal 40 by sensing, as well as a second current transformer element 114 being connected in series with the second switch 112 and generating a second detecting signal 41 by sensing. After the first detecting signal 40 and the second detecting signal 41 are acquired, in the present invention, the first detecting signal 40 and the second detecting signal 41 are further integrated to obtain a first integrated signal 42 corresponding to the current flowing through the input inductor 3, so as to obtain current waveform for the input inductor 3. Furthermore, each of the first current transformer element 113 and the second current transformer element 114 is a current transformer. In one embodiment, the first current transformer element 113 is connected with a first rectifying unit 115 for rectifying the first detecting signal 40, while the second current transformer element 114 is connected with a second rectifying unit 116 for rectifying the second detecting signal 41. Moreover, each of the first rectifying unit 115 and the second rectifying unit 116 is presented as a full-wave rectifying configuration individually. On the other hand, the disclosed signal integration of the present invention may be achieved via software or hardware.

Then, simulation of the current disclosed in this embodiment is performed for specifying the implementation of the present invention. It is predetermined that each of the first switch 111, the second switch 112, the third switch 121 and the fourth switch 122 is an active element individually. Moreover, a current-sensing unit (not shown in this figure) is provided for the input inductor 3, so as to obtain a current signal 31 of the input inductor 3 as a result for comparison. Afterwards, the AC power source 2 is simulated for positive half cycle, as well as the current signal 31, the first detecting signal 40, the second detecting signal 41 and the first integrated signal 42 are shown in FIG. 3. As drawn in FIG. 3, the equivalence between the waveform of the first integrated signal 42 and the waveform of the current signal 31 may be then appreciated unambiguously, such that variance of waveform for the input inductor 3 during positive half cycle may be possibly realized via the waveform of first integrated signal 42 directly. On the other hand, the AC power source 2 is simulated for negative half cycle, and the current signal 31, the first detecting signal 40, the second detecting signal 41 and the first integrated signal 42 are then shown in FIG. 4. As such, the equivalence between the waveform of first integrated signal 42 and the waveform of current signal 31 may be appreciated unambiguously, such that variance of waveform for the input inductor 3 during negative half cycle may be realized via the waveform of first integrated signal 42 directly. Thereby, the practical problems originating from the conventional necessity for the establishment of bulky Hall device or another current-sensing unit may be solved specifically via the embodiment disclosed in the present invention.

Figure 5:
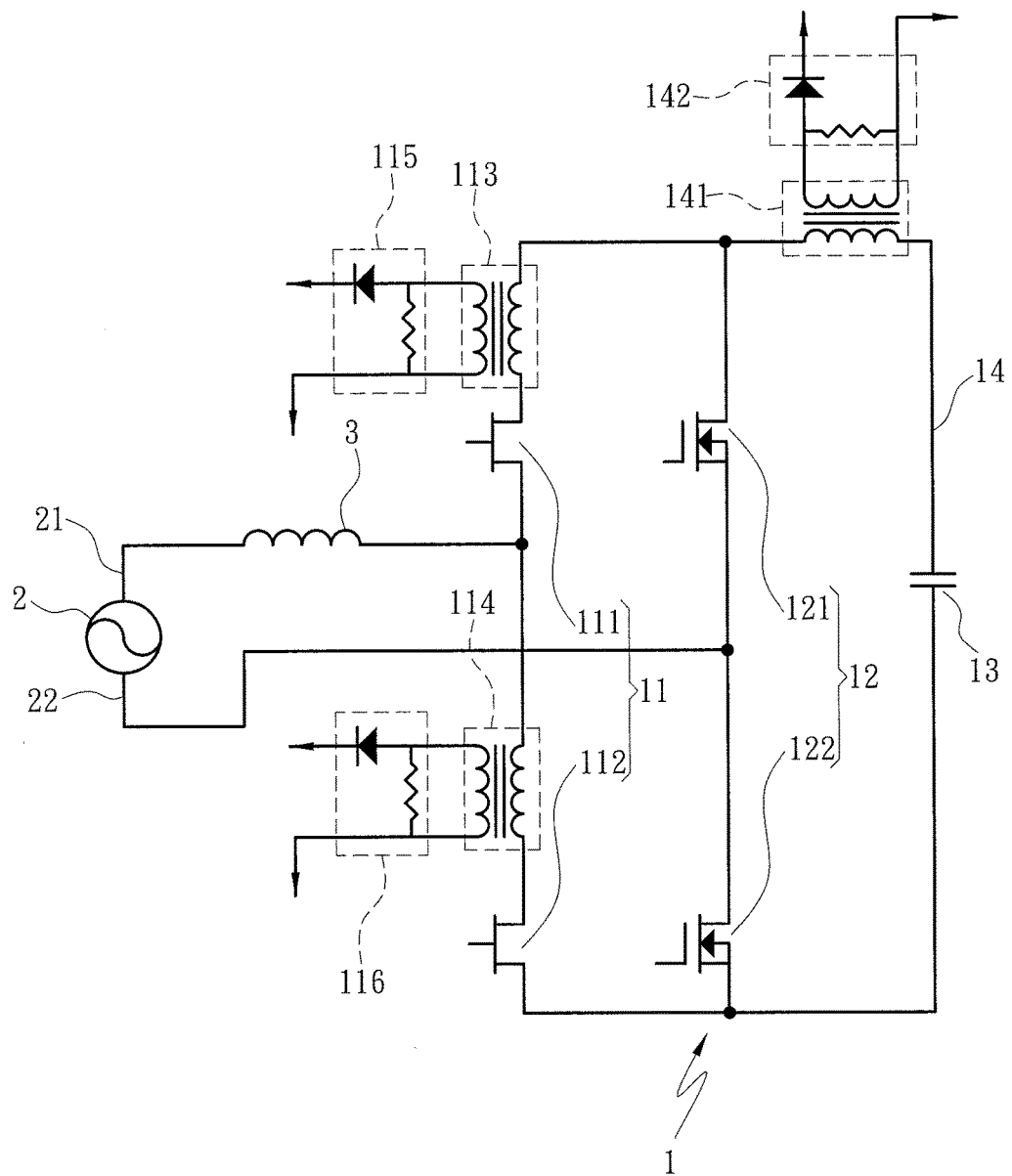
FIG. 5 is a diagram of a circuit composition of a second embodiment of the present invention.
Figure 6:
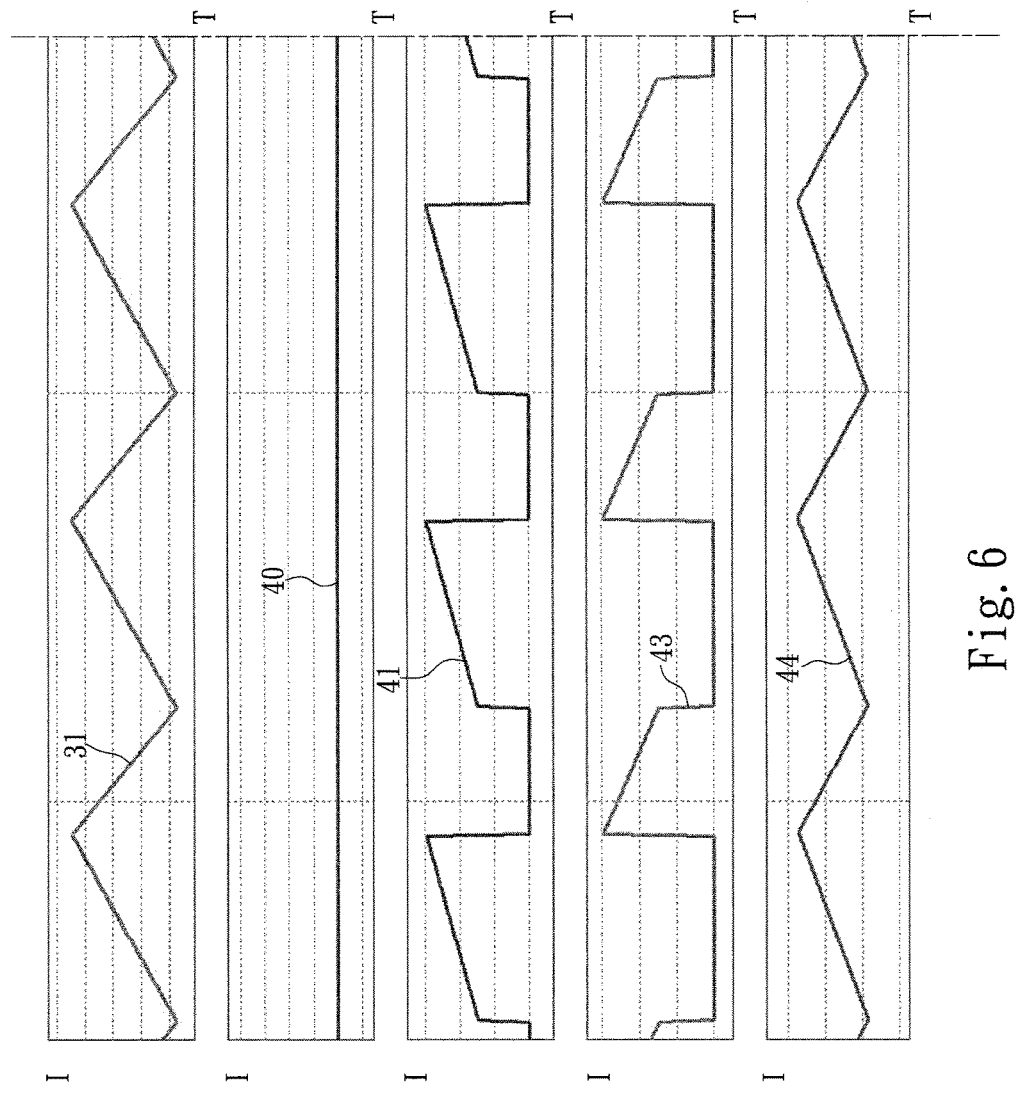
FIG. 6 is a diagram of current waveform during positive half cycle of the second embodiment of the present invention.
Figure 7:
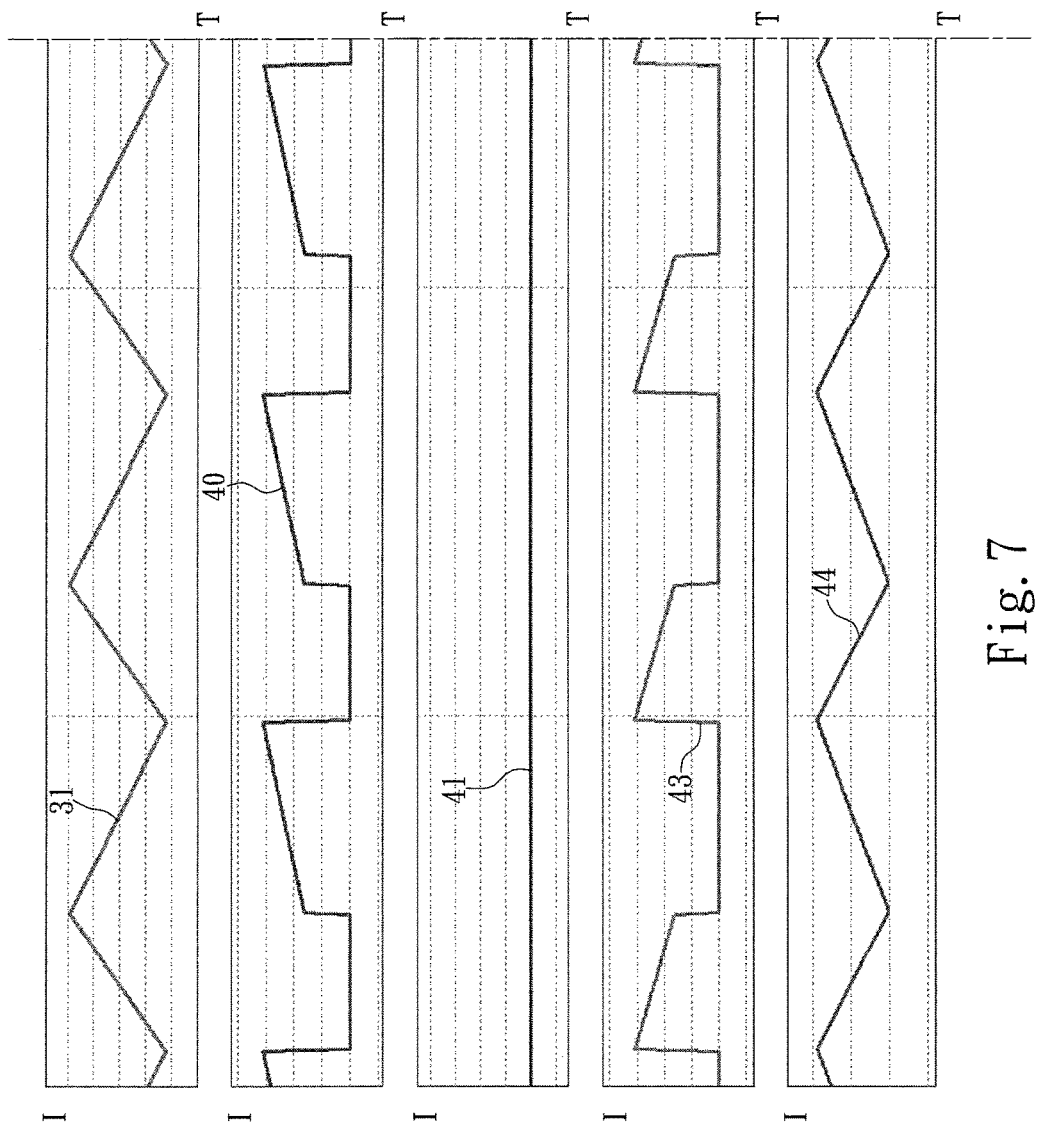
FIG. 7 is a diagram of current waveform during negative half cycle of the second embodiment of the present.

Referring to FIGS. 5 to 7, the totem-pole PFC 1 of this embodiment is similar to that described above, while a branch 14 to which the capacitor 13 is attached, in addition to the first bridge arm 11, is also presented as the high-frequency working area. In this embodiment, the branch 14 comprises a third current transformer element 141 generating a third detecting signal 43. Moreover, the third current transformer element 141 is connected with a third rectifying unit 142 rectifying the third detecting signal 43. In this embodiment, each of the first rectifying unit 115, the second rectifying unit 116 and the third rectifying unit 142 is presented as a half-wave rectifying configuration individually. On the other hand, a second integrated signal 44 may be generated by integrating the first detecting signal 40, the second detecting signal 41 and the third detecting signal 43, so as to obtain current waveform for the input inductor 3. By further applying above simulation scheme to this embodiment, the AC power source 2 is simulated for positive half cycle, and the current signal 31, the first detecting signal 40, the second detecting signal 41, the third detecting signal 43 and the second integrated signal 44 are disclosed in FIG. 6, respectively. As disclosed in FIG. 6, the equivalence between the waveform of second integrated signal 44, obtained by integrating the first detecting signal 40, the second detecting signal 41 and the third detecting signal 43, and the waveform of current signal 31 may be then appreciated unambiguously, such that variance of waveform for the input inductor 3 during positive half cycle may be possibly realized via the waveform of first integrated signal 42 directly. On the other hand, the AC power source 2 is simulated for negative half cycle, and the current signal 31, the first detecting signal 40, the second detecting signal 41, the third detecting signal 43 and the second integrated signal 44 are then shown in FIG. 7. As such, the equivalence between the waveform of second integrated signal 44 and the waveform of current signal 31 may be appreciated unambiguously, such that variance of waveform for the input inductor 3 during negative half cycle may be realized via the waveform of second integrated signal 44 directly.

Figure 8:
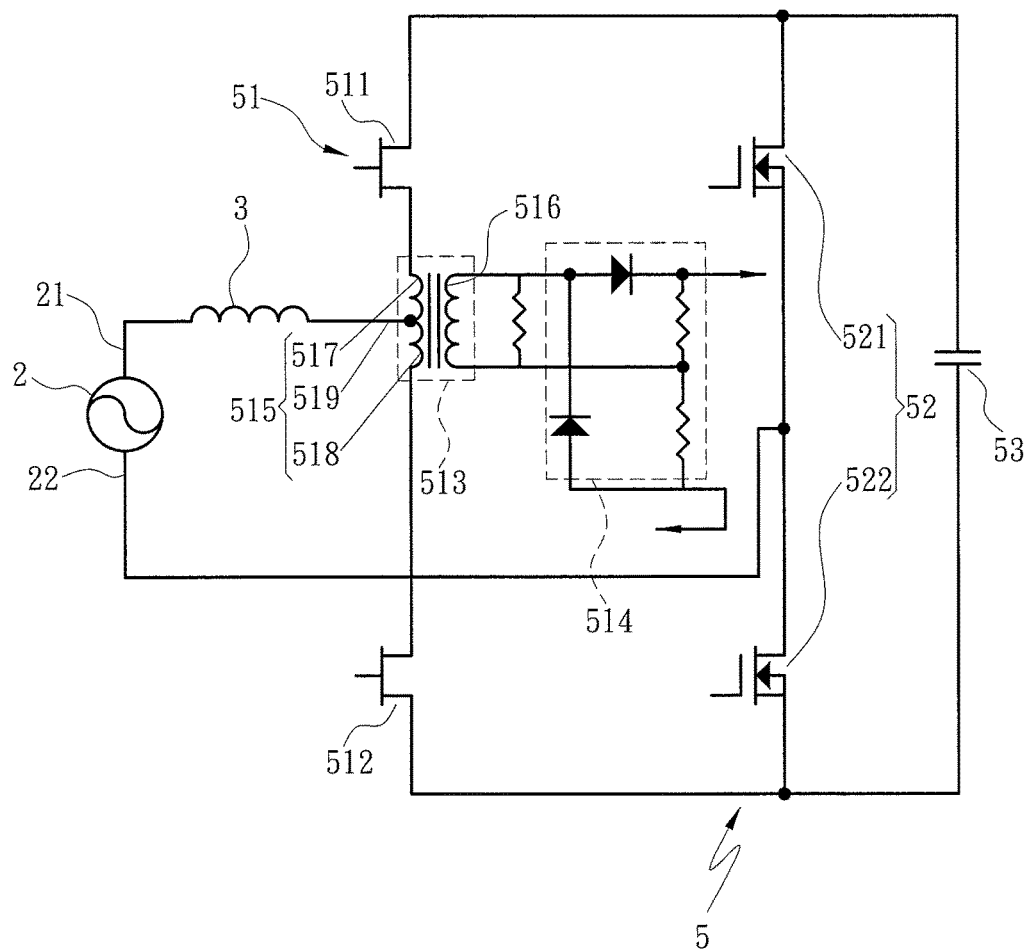
FIG. 8 is a diagram of a circuit composition of a third embodiment of the present invention.
Figure 9:
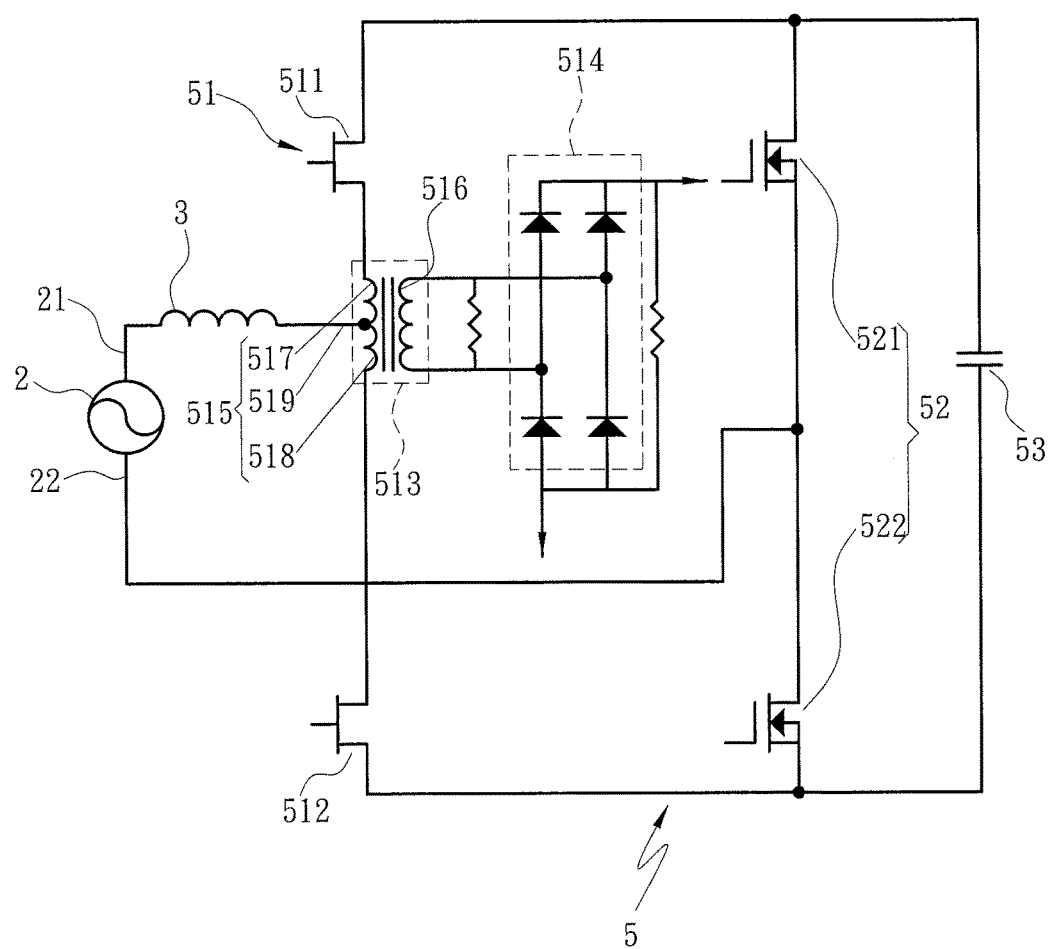
FIG. 9 is a diagram of a circuit composition of a fourth embodiment of the present invention.

Referring to FIG. 8, as illustrated in this figure, a totem-pole PFC 5 in this embodiment is connected behind the input inductor 3. The totem-pole PFC 5 comprises a first bridge arm 51, a second bridge arm 52 connected in parallel with the first bridge arm 51, and a capacitor 53 connected in parallel with the first bridge atm 51 and the second bridge atm 52. In this case, the first bridge arm 51 comprises a first switch 511 and a second switch 512 connected in series with the first switch 511. The second bridge arm 52 comprises a third switch 521 and a fourth switch 522 connected in series with the third switch 521. The second bridge arm 52 is connected to the second connecting terminal 22 of the AC power source 2 at a series connection point between the third switch 521 and the fourth switch 522. Moreover, the working frequency of the first bridge arm 51 is controlled to be higher than that of the second bridge arm 52 by the totem-pole PFC 5. Therefore, the first bridge arm 51 is presented as the high-frequency working area in the overall circuit of the totem-pole PFC 5. Further, the first bridge arm 51 is further provided with a center-tapped current transformer element 513 provided between the first switch 511 and the second switch 512 as well as connected to the input inductor 3, and a fourth rectifying unit 514 connected to the center-tapped current transformer element 513. Moreover, the center-tapped current transformer element 513 comprises a primary winding 515 and a secondary winding 516 with magnetic induction formed therebetween. The primary winding 515 further comprises a first subwinding 517, a second subwinding 518, a center tap 519 connected to the first subwinding 517, the second subwinding 518 and the input inductor 3. Magnetic induction is formed between the first subwinding 517 and the secondary winding 516 due to passing the current through the first subwinding 517 when the first switch 511 is turned on. Further, magnetic induction is formed between the second subwinding 518 and the secondary winding 516 due to passing the current through the second subwinding 518 when the second switch 512 is turned on. Thereby, a fourth detecting signal 45 is generated by the center-tapped current transformer element 513 on the secondary winding 516 thereof, while the fourth detecting signal 45 is then received, from the center-tapped current transformer element 513, and rectified by the fourth rectifying unit 514 to obtain a rectified signal 46 corresponding to current waveform for the input inductor 3. Referring to FIGS. 8 and 9, FIG. 9 is a diagram of a circuit composition of a fourth embodiment of the present invention. In one embodiment, the fourth rectifying unit 514 may be presented as a half-wave rectifying configuration or a full-wave rectifying configuration.

Figure 10:
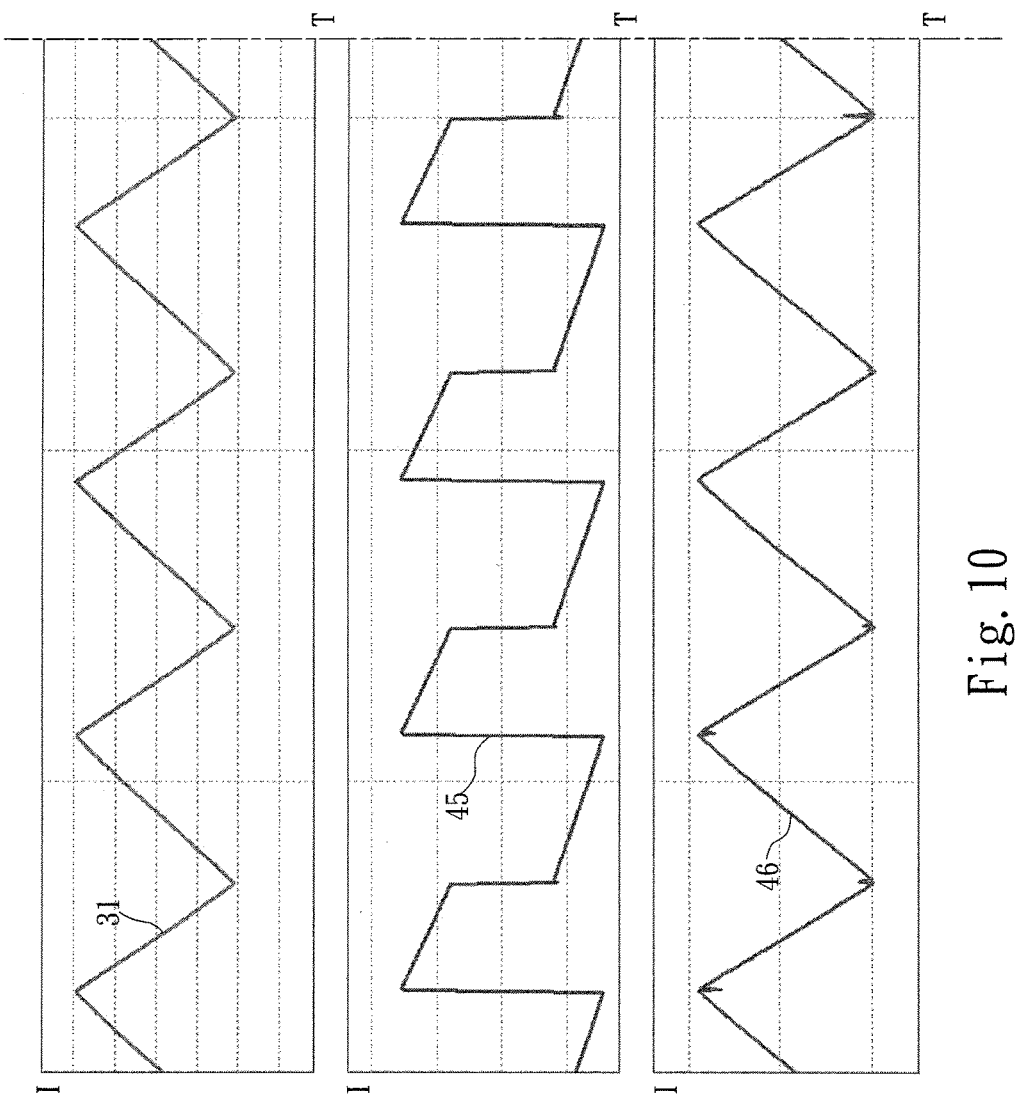
FIG. 10 is a diagram of current waveform during positive half cycle of the third embodiment of the present invention.
Figure 11:
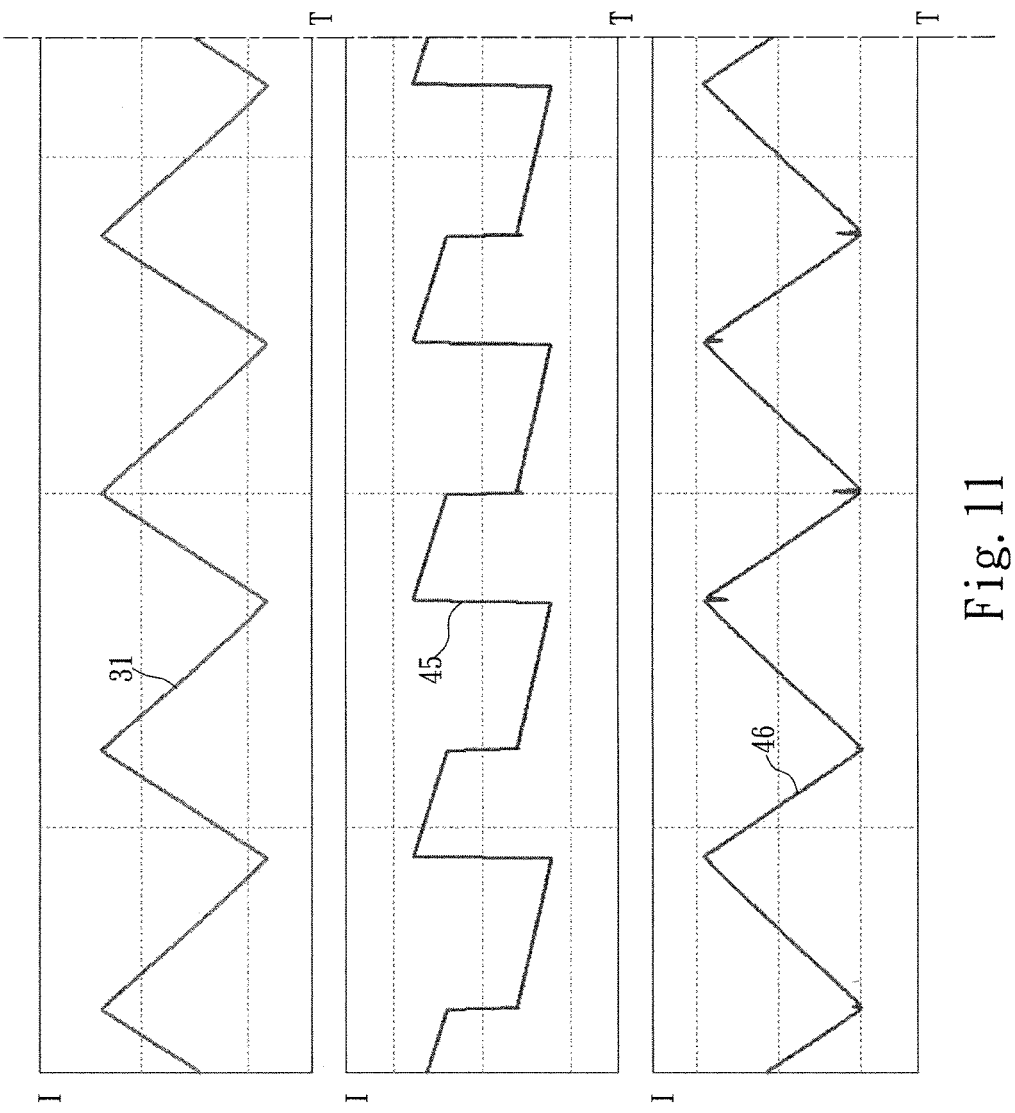
FIG. 11 is a diagram of current waveform during negative half cycle of the third embodiment of the present invention.

Then, referring to FIGS. 10 to 11 together, simulation of the circuit disclosed in this embodiment is performed herein. It is predetermined that each of the first switch 511, the second switch 512, the third switch 521 and the fourth switch 522 is an active element individually. Moreover, the current-sensing unit (not shown in this figure) is provided for the input inductor 3, so as to obtain the current signal 31 of the input inductor 3 as a result for comparison. Afterwards, the AC power source 2 is simulated for positive half cycle, and the current signal 31, the fourth detecting signal 45 and the rectified signal 46 are shown in FIG. 10. As drawn in FIG. 10, the equivalence between the waveform of rectified signal 46 and the waveform of current signal 31 may be then appreciated unambiguously, such that variance of waveform for the input inductor 3 during positive half cycle may be possibly realized via the waveform of rectified signal 46 directly. On the other hand, the AC power source 2 is simulated for negative half cycle, and the current signal 31, the fourth detecting signal 45 and the rectified signal 46 are then shown in FIG. 11. As such, the equivalence between the waveform of rectified signal 46 and the waveform of current signal 31 may be appreciated unambiguously, such that variance of waveform for the input inductor 3 during negative half cycle may be realized via the waveform of first integrated signal 42 directly. Therefore, the practical problems derived from the prior art may be solved to produce the effect of circuit simplification.

What is claimed is:

1. A totem-pole power factor correction circuit (totem-pole PFC), connected behind an input inductor receiving electric power from an alternating current (AC) power source, said AC power source being provided with a first connecting terminal connected to said input inductor, and a second connecting terminal, comprising:

a first bridge arm comprising a first switch and a second switch connected in series with said first switch, said first bridge arm being connected to said input inductor at a series connection point between said first switch and said second switch;

a second bridge arm, connected in parallel with said first bridge arm, comprising a third switch and a fourth switch connected in series with said third switch, said second bridge arm being connected to said second connecting terminal of said AC power source at a series connection point between said third switch and said fourth switch; and a capacitor connected in parallel with said first bridge arm and said second bridge arm;

wherein said first bridge arm is presented as a high-frequency working area, and provided with a first current transformer element being connected in series with said first switch and generating a first detecting signal by sensing, as well as a second current transformer element being connected in series with said second switch and generating a second detecting signal by sensing, said first detecting signal and said second detecting signal being integrated to obtain current waveform for said input inductor.

2. The totem-pole PFC according to claim 1, wherein said first current transformer element is connected with a first rectifying unit for rectifying said first detecting signal, while said second current transformer element is connected with a second rectifying unit for rectifying said second detecting signal.

3. The totem-pole PFC according to claim 2, wherein each of said first rectifying unit and said second rectifying unit is presented as a full-wave rectifying configuration individually.

4. The totem-pole PFC according to claim 1, wherein a branch to which said capacitor is attached is presented as the high-frequency working area, said branch comprising a third current transformer element generating a third detecting signal, current waveform for said input inductor being then obtained by integrating said first detecting signal, said second detecting signal and said third detecting signal.

5. The totem-pole PFC according to claim 4, wherein said first current transformer element is connected with a first rectifying unit rectifying said first detecting signal, said second current transformer element is connected with a second rectifying unit rectifying said second detecting signal, and said third current transformer element is connected with a third rectifying unit rectifying said third detecting signal.

6. The totem-pole PFC according to claim 5, wherein each of said first rectifying unit, said second rectifying unit and said third rectifying unit is presented as a half-wave rectifying configuration individually.

7. A totem-pole power factor correction circuit (totem-pole PFC), connected behind an input inductor receiving electric power from an alternating current (AC) power source, said AC power source being provided with a first connecting terminal connected to said input inductor, and a second connecting terminal, comprising:

a first bridge arm comprising a first switch and a second switch connected in series with said first switch;

a second bridge arm, connected in parallel with said first bridge arm, comprising a third switch and a fourth switch connected in series with said third switch, said second bridge arm being connected to said second connecting terminal of said AC power source at a series connection point between said third switch and said fourth switch; and a capacitor connected in parallel with said first bridge arm and said second bridge wherein said first bridge arm is presented as a high-frequency working area, and provided with a center-tapped current transformer element provided between said first switch and said second switch as well as connected to said input inductor, and a fourth rectifying unit connected to said center-tapped current transformer element, a fourth detecting signal being generated by said center-tapped current transformer element, said fourth detecting signal being rectified by said fourth rectifying unit to obtain a rectified signal corresponding to current waveform for said input inductor.

8. The totem-pole PFC according to claim 7, wherein said center-tapped current transformer element comprises a primary winding and a secondary winding with magnetic induction formed therebetween, said primary winding further comprising a first subwinding, a second subwinding, and a center tap connected to said first subwinding, said second subwinding and said input inductor.

9. The totem-pole PFC according to claim 8, wherein said fourth rectifying unit is presented as a half-wave rectifying configuration.

10. The totem-pole PFC according to claim 8, wherein said fourth rectifying unit is presented as a full-wave rectifying configuration.

* * * * *